C. R. SHAW.

Refrigerator.

No. 9,742. Reissued June 7, 1881.

Witnesses

W. B. Masson.

E. A. Sperry.

Inventor:

Cyrus B. Shaw by J. R. Nottingham

Atty.

N. PETERS, Photo-Lithographer, Washington, D. C.

UNITED STATES PATENT OFFICE.

CYRUS B. SHAW, OF BROOKLYN, NEW YORK.

REFRIGERATOR.

SPECIFICATION forming part of Reissued Letters Patent No. 9,742, dated June 7, 1881.

Original No. 218,783, dated August 19, 1879. Application for reissue filed April 12, 1881.

*To all whom it may concern:*

Be it known that I, CYRUS B. SHAW, of Brooklyn, in the county of Kings and State of New York, have invented certain new and useful Improvements in Refrigerators; and I do hereby declare the following is a full, clear, and exact description of the invention, that will enable others skilled in the art to which it appertains to make and use the same, reference being had to the accompanying drawings, and to the letters of reference marked thereon, which form a part of this specification.

The object of this invention is to furnish improved refrigerators, ice-boxes, ice-houses, &c., which shall be so constructed as to use less ice than refrigerators constructed in the usual way, be more easily kept clean and sweet, and be more easily repaired when required, and which shall be simple in construction, inexpensive in manufacture, and convenient in use.

In carrying out my invention I employ the mechanisms and devices as fully illustrated in the accompanying drawings, which form a part of this specification, and in which—

Figure 1:
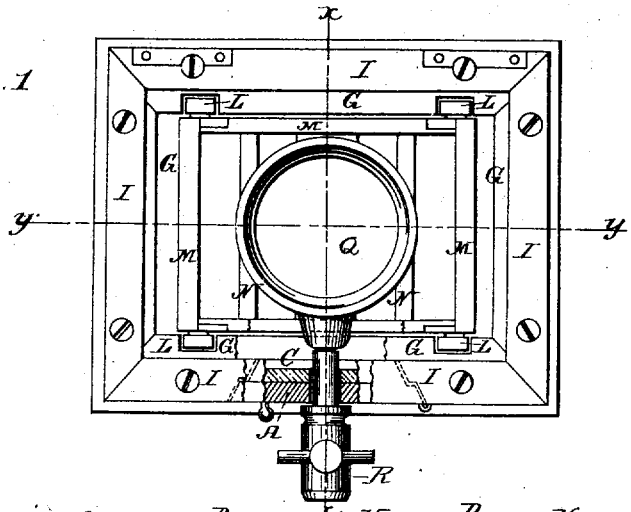
Figure 2:
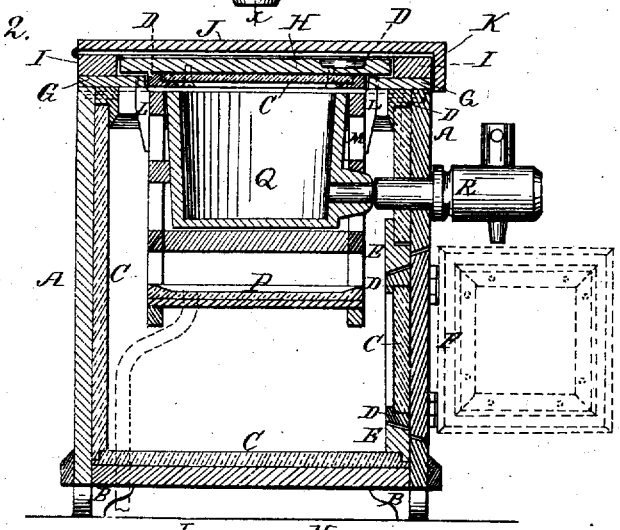

Figure 1 is a top plan view, partially in section; Fig. 2, a vertical section through the line *x x* of Fig. 1, and Fig. 3 a vertical section of the same through the line *y y* of Fig. 1.

Referring to the drawings, in which similar letters of reference indicate like parts in all the figures, A represents the box or case of my improved refrigerator, which may be made plain or paneled, as may be desired, and is supported upon short legs B, to raise its bottom from the ground and form space for the drip-pan.

The inner surface of the box or case A is lined with slabs C of plaster-of-paris, which are cast and allowed to set in molds of the required shape and size. The lower and side edges of the slabs C are halved, dovetailed, or otherwise jointed to each other, so as to form close connections, and to keep the said slabs in place.

The upper edges of the slabs C are held in place by rabbeted cleats D, which are detachably secured to the inner sides of the upper edges of the box A, so that by detaching said cleats any or all of the slabs C may be detached and replaced by new ones. It will be observed that the removable slabs are non-conductors of heat, and that the cleats D serve an important function in connection with said non-conducting slabs.

The doorway is surrounded with cleats E, which are rabbeted to receive the edges of the slabs C. The door (marked F in the drawings) is also lined or provided with a non-conducting slab, of plaster-of-paris or the like, which is kept in place by rabbeted cleats D, attached to the inner sides of the edges, and the upper one of which is detachable, so that the lining-slab may be conveniently detached and replaced at will.

To the upper edge of the box A are attached cap-cleats G, the inner edges of which project beyond the inner surfaces of the lining-slabs C to form a seat for the rabbeted edges of the inner cover, H, which is hinged at its rear edge to the rear cap-cleat, G. The cover H is lined with a plaster-of-paris slab, C, which is kept in place by rabbeted cleats D. The forward cleat D is detachable, so that the slab C can be readily removed when desired.

To the upper sides of the outer parts of the cleats G are attached cap-cleats I, which surround the edges of the cover H and form a seat for the outer cover, J. The cover J is hinged at its rear edge to the rear cap-cleat I and has flanges or cleats K attached to its side and front edges to overlap the upper parts of of the sides and front of the box A.

In the projecting inner edges of the rear and front cap-cleats G are formed dovetailed or other notches or recesses to receive corresponding connections.

The rack M is made rectangular in form, and with open-work or skeleton sides and ends to allow the air cooled by the ice to pass down into the lower part of the box A. The rack M is made with an open-work or skeleton false-bottom, N, at a little distance above the true bottom O, to receive the ice and allow the water from the melting ice to drop to the said true bottom O.

Figure 3:
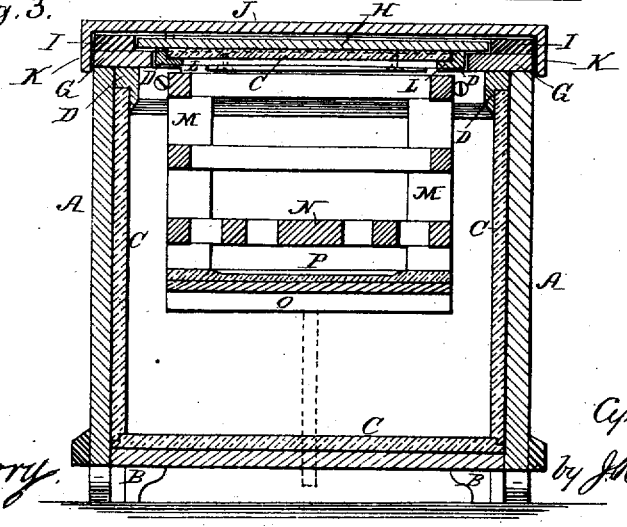

The bottom O has a plaster-of-paris slab, P, placed upon it, which slab is concaved, to adapt it to receive the drip-water and conduct it to the drip-pipe, which passes out through the bottom or side of the box A in the usual way, as indicated in dotted lines in Figs. 2 and 3.

In the ice-rack M, upon the middle part of the false-bottom N, is placed a vessel, Q, to serve as a reservoir for water to be cooled for drinking purposes. The reservoir Q should be made of earthenware or some other material that will not corrode, and will not affect the water, and of such a size as to leave sufficient space between it and the sides of the rack M to receive a suitable supply of ice.

In the drawings, the reservoir Q is represented as being cylindrical in form; but I prefer to make it rectangular, as forming better-shaped spaces to receive ice.

In the lower part of the forward side of the reservoir Q is formed a hole to receive the faucet R, which passes in through a hole in the forward side of the box A, so that the cold water can be readily drawn out, as required.

With this construction the water in the reservoir Q will be kept cool, and will be free from the objections of having ice-water mingled with it.

What I claim as new, and desire to secure by Letters Patent of the United States, is—

1. A removable non-conducting lining for refrigerators, of plaster-of-paris, made in sections and jointed to match each with the other, combined with a holding-case, a removable top, and a hinged door having similar lining, substantially as and for the purposes set forth.

2. The frame A, combined with an outlet-pipe, R, from a reservoir, Q, the removable lining-slabs C, of plaster-of-paris, dovetailed or jointed, as shown, the door F, and hinged cover J, having similar lining, all constructed and arranged as and for the purposes set forth.

3. The combination of the cleats G, having dovetailed notches, the dovetailed bars L, and the rack M, substantially as and for the purpose specified.

In testimony whereof I affix my signature in presence of two witnesses.

CYRUS B. SHAW.

Witnesses:
GEO. MACARTNEY,
E. C. TOWNSEND.